May 25, 1965          R. CAILLET          3,185,205
REMOVABLE ROOF ON RAPID-MOVING VEHICLES
Filed Jan. 9, 1961          2 Sheets-Sheet 1
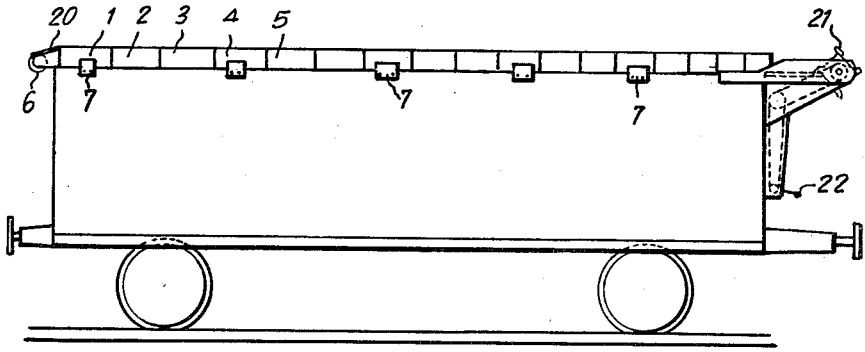
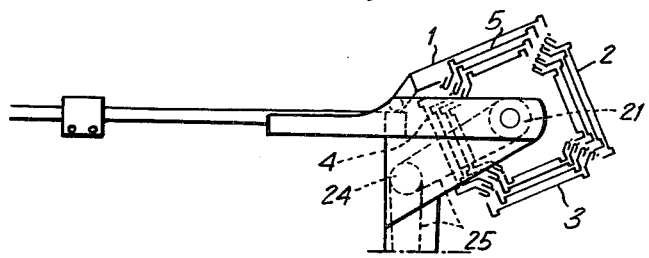
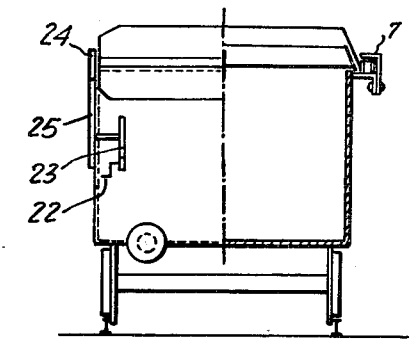
INVENTOR
RENÉ CAILLET
By Linton and Linton
ATTORNEYS

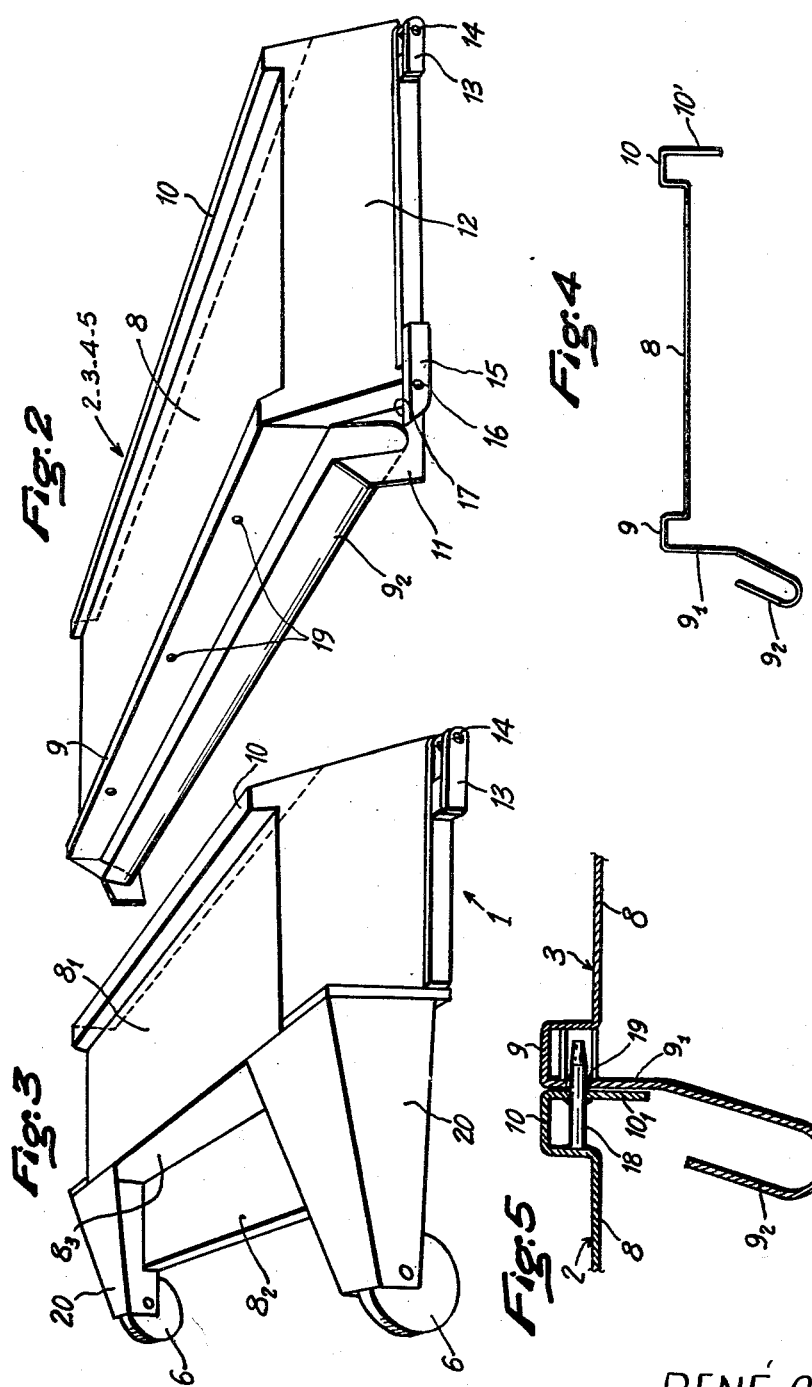

United States Patent Office 3,185,205
Patented May 25, 1965

3,185,205
REMOVABLE ROOF ON RAPID-MOVING
VEHICLES
René Caillet, 26 Rue de la République,
Saint-Germain-en-Laye, France
Filed Jan. 9, 1961, Ser. No. 81,425
Claims priority, application France, Jan. 19, 1960, 816,017
2 Claims. (Cl. 160—133)

The present invention relates to a removable roof on rapid-moving vehicles, which roof presents at least in one direction a great rigidity and which can be folded or rolled-up to a small volume still retaining a great watertightness. Such a system avoids a covering by means of large tarpaulins which have to be properly stretched out—a rather dangerous practice in case of windy weather, quite apart from the fact that it is difficult to fasten them tightly and to provide them with a hermetic sealing since they must pass the customs.

The novelty of the present invention consists in providing such vehicles with a roof made of metallic plates or elements, said roof being arranged to be rolled-up in a way which has already been in use for the most varied appliances, namely for covering hatchway panels on shipboard. Such panels which in a way constitute an articulate curtain are mostly made up of a succession of metallic pieces or elements hinged together nestingly, the tightness of the assembly being obtained by use of a rubber joint which it is difficult to keep in perfect working order should the vehicle be successively in the care of different attendants.

The object of the present invention is to overcome aforesaid drawbacks and to solve them by means of a removable roof installed on top of rapid-moving vehicles such as railway wagons, lorries, trailing-cars or other similar type of vehicles, which is characterized in that the metallic panel is made of a succession of profile elements which are hinged together so as to allow the folding-up of said panel, provision being made for disposing a rim or gutter at each junction point of said succession of profile elements so as to ensure the watertightness of such vehicles by means of rain collectors.

According to another characteristic of the present invention, each profile piece includes at least one wall positioned in the plane of the horizontal surface to be covered and two reinforcement walls disposed along the lengthwise edges of this first wall but normal to the direction of said plane, one of said reinforcement walls extending downwards but in deviation from its vertical direction, after which it becomes again parallel to its previous direction having described a reverse loop producing a deep cavity which extends all along the length of the profile piece, so as to form a rim which should be deep enough and shaped in such a way as to avoid having water drop inside the vehicle, while helping to increase the roof inertia and also to constitute a reinforcement to make it able to resist the weight of several people standing on it.

In order to obtain a perfect rolling-up of such a roof and to be able under any condition to fold it down to a small volume, it is obvious that the rim edge and the size of all elements or parts should be designed so as to fit into each other during the rolling-up operation.

According to another characteristic of the present invention, deflectors are provided at the remote ends of the rims so as to avoid any entrance of rain water coming from the latter and penetrating inside the vehicle.

According to still another characteristic item of the present invention, all profile pieces constituent of the roof are articulated to each other at their outer extremities by means of hinges which are located so as to prevent any gaps being formed along the rims. The present invention also includes an embodiment in which friction rollers are provided at the front part of the initial piece of the series constituting the roof, such friction rollers allowing an easy sliding of the combined system of the rolling movement. Auxiliary rollers may also be provided alongside each piece or element in order to facilitate such sliding. The whole roof assembly is secured to the vehicle by means of hinges or hooks.

A removable roof according to the present invention is now described in detail by way of a non-limiting example, in conjunction with the accompanying drawings, in which:

FIGURE 1 is a schematic view of a wagon equipped with a roof according to the present invention;

FIGURE 2 is a perspective view of one of the pieces or constituent elements that said roof is made of;

FIGURE 3 is a perspective view of the initial front piece or element of said roof including friction rollers so as to allow the whole of the roof to slide properly into its true position;

FIGURE 4 shows schematically the profile of one piece or element of the assembly represented in FIGURE 2;

FIGURE 5 shows by way of an example the type of interlocking system between adjacent pieces or elements which are cooperating to give inertia to the whole assembly of the roof;

FIGURE 6 shows diagrammatically a fragmentary view of the rear of the wagon with its roof open, its constituent elements being in the rolled-up position; and FIGURE 7 shows the far-off rear extremity of the wagon in vertical half section with one-half of the roof being open, the other half being closed down, as well as the drive and transmission system for the rolling-up drum.

According to the present invention, the roof represented on the accompanying figures is constituted of a metallic panel formed by successive profile elements 1, 2, 3, 4, 5 and so on, the length dimensions of which are gradually decreasing and which are interlocked so as to permit the winding-up of the panel to constitute compactly a reduced volume whenever such operation is required, for instance, when a loading of the wagon is to be made.

With the exception of initial piece 1 which is the front element and is provided with rollers 6 on its front part of which the object is to induce the sliding of the whole of the roof panel along its rolling pathways located on the respective sides of the vehicle, all other elements 2, 3, 4 and 5, and so on, constitute the aggregate of elements the roof is made of, as shown individually in FIGURE 4, constituted of a wall 8 located in the plane of the surface to be covered, that is to say horizontally, and so act also the strengthening walls 9 and 10 located alongside the transverse edges of wall 8, but with a profile remaining that of an inverted U.

Such U profiles 9 and 10 also play an important part in obtaining the watertightness of the roof. In fact, they prevent practically the whole of the water falling on the roof from reaching the rim or edge, by reason of the presence of the barriers which they constitute. The U-shaped profile wall 9 forming the junction of the entirety of the reinforcing walls located in front of the plane wall 8, includes an outside pillar or post $9_1$ which dips downwards, first perpendicularly to the plane horizontal wall 8 and then obliquely returning parallel to itself after having formed a reverse re-entrant curl so as to form a gutter $9_2$. Such gutter $9_2$ cooperates to give the roof a large inertia, though it does not interfere in the slightest way with the rolling-up of the pieces or elements.

The inverted U profile wall 10 which in its entirety constitutes the reinforcement walls located in the rear part of the plane horizontal wall 8 includes an external pillar or post $10_1$ which extends downwards perpendicularly to horizontal wall 8 for a height which is equal to that of the perpendicular pillar 9 of the inverted U-profile mounted in the front face of the particular piece or element. Such arrangement allows the vertical transverse lateral rear part 10 of each elementary piece or element of the series 2, 3, 4, 5 to be fixed in juxtaposition against the vertical front part $9_1$ of the next such elementary piece or element without being interfered with by the rim $9_2$.

Referring to FIGURE 2, it should be noted that rims $9_2$ extending on their extreme longitudinal ends with an obliquely cut edge 11 possess an identical inclination to that of the terminal edges 12 of the elements as 2, extending at each extremity of the elementary pieces, such edges 12 acting as deflectors or baffle plates in order to prevent rainwater from entering inside the vehicle and to force such water to enter into the lateral railing cavities or gutters (not shown) which act as rolling paths for rollers 6 of the elementary front piece 1.

A good hinging of the various elementary pieces between each other is obtained by means of appropriate hinges located outside terminal edges 12 so as to avoid interferring with the action of the rims $9_2$ by interrupting them in their course of translation. Such hinges are made of covers 13 mounted at both lateral ends of each elementary piece inside the oblique lateral edge 12 in rear direction, that is to say in the sense opposite that which forms the rim $9_2$. Each of such covers 13 drilled at 14 is made to cooperate with a protruding piece 15—also drilled at 16—and located perpendicularly to the direction of the rim $9_2$. A clearance 17 having an appropriate width is provided between the edge 11 acting as a deflector for rims $9_2$ so as to permit the edge 11 to engage itself inside the immediately preceding element of the series. There is, an axle or pin—not shown on the figures—which is placed inside holes 14 and 16 to connect and articulate covers 13 with the protruding piece 15.

In order to increase the inertia conferred to the whole panel forming the roof of the vehicle when its elementary pieces are unfolded, and also in order to allow the panel when unfolded to stand the weight of several people, an automatic locking device has been provided. Such automatic locking device is shown in FIGURE 5 and is made of metallic keys 18 acting integrally and located perpendicularly to profile lateral wall 10 so as to constitute the reinforcing portions of the rear part of each elementary piece, such keys or wedges cooperating with the holes 19 arranged for in the inverted U shaped lateral profile wall 9 forming the frontal reinforcement walls of each elementary piece of the series. A cooperation of keys 18 with their corresponding holes 19 results automatically when the roof is set in position. The same occurs for their disengagement.

The disposition of the rollers 6 on the front side of the elementary initial front piece 1 of the roof (see FIGURE 3) is positioned in such a way that—once the roof is extended these rollers extend beyond along the whole of the length of the vehicle so that the front end of said initial elementary piece 1 covers and almost fits inside the front end of the vehicle (see FIGURE 1). Said front element 1 presents a rather peculiar "scale"-shape, the horizontal walls 8 of which include reinforcement walls 10 the aim of which is identical to that already described. The lowest horizontal part $8_2$ (FIG. 3) of front-element 1 is arranged to be integral with the horizontal part $8_1$ of the same elementary piece 1 by means of a vertical wall $8_3$. The rollers 6 are put slightly in front of wall $8_2$ at each extremity and are held by brackets 20 having the form of wedges. In order to facilitate the sliding of the roof, auxiliary rollers—not shown on the figures—may be provided on the sides of each elementary piece.

The whole of the above described roof is secured on top of the vehicle by means of hooks 7 (FIG. 1) which may be set up lengthwise on the vehicle outside the railing cavities or gutters acting as rolling pats—not shown on the figures—acting as guides for rollers 6.

Rolling-up of such a roof is usually done in the same way as in the case of whatever metallic folding-up panels using a winding drum 21 are arranged for at the rear part of the vehicle.

It is obvious that for obtaining such winding-up within a small volume as represented in FIGURE 6, the dimensions of the elementary pieces should be appropriately chosen to diminish progressively to engage nestingly into each other at every fourth point of them. Effectively said FIGURE 6 shows the elementary piece 5 which is meant to fit inside element 1 to be of smaller size than the latter. Winding-up of the drum 21 can be obtained by means of a crank 22 (FIG. 1) and by means of an appropriate transmission such as a reduction socket 23, pinions 24 and chains 25 (FIGURE 7). It is also possible to provide for an automatic winding means and to replace the crank by a motor.

The present invention thus provides a possibility to install a removable roof on top of vehicles which travel fast and having a large inertia, providing an easy maintenance, securing a perfect watertightness inside the vehicle and being rolled up in a compact mass, and so on.

Obviously the present invention is not limited by the particular embodiment described in the example given and illustrated since many alterations may be provided according to many other forms and ways of presentation, while still remaining within the scope of this present invention.

What I claim is:

1. In a removable roof assembly for vehicles, a series of transverse roof panel units arranged in a longitudinal series, the longitudinal dimension in the direction of arrangement of said series decreasing progressively from the initial terminal unit to the final terminal unit to permit nesting superposition thereof, each said panel unit having a central flat face, lateral faces on said unit extending in the direction in which said units are arranged, hinge means mounted on said lateral faces and adapted to hingedly interconnect adjacent ones of sad units in said series, said lateral faces sloping obliquely to the plane of said central flat face, and acting as rain baffle plates, each said unit being provided on a first one of its faces which adjoins an adjacent said unit in said series with a gutter structure having a re-entrantly turned edge adapted to collect rain falling on its said central flat face but extending below said central flat face without interferring with tight engagement of adjacent faces of said units, and each said unit further being provided on the second one of its faces which adjoins an adjacent said unit in said series with a heavy re-enforcing face porton extending perpendicularly to said central flat face thereof.

2. A roof assembly according to claim 1, the gutter structure and the re-enforcing face portion of each said unit being provided with apertures which register with corresponding apertures in the gutter structure and re-enforcing face portion of the adjacent said units in said series, and keying means carried on said re-enforcing face portion insertable in said apertures and adapted to fixedly interlock adjacent ones of said units.

References Cited by the Examiner
UNITED STATES PATENTS 763,493  6/07  Lacey _____ 160—118

FOREIGN PATENTS 1,126,637  7/56  France.
753,056  7/56  Great Britain.

HARRISON R. MOSELEY, *Primary Examiner.*

GEORGE A. NINAS, Jr., LAWRENCE CHARLES, NORTON ANSHER, *Examiners.*